United States Patent [19]

Radek

[11] 4,047,614

[45] Sept. 13, 1977

[54] BICYCLE RACK

[75] Inventor: John R. Radek, Hinsdale, Ill.

[73] Assignee: Ready Metal Manufacturing Company, Chicago, Ill.

[21] Appl. No.: 599,819

[22] Filed: July 28, 1975

[51] Int. Cl.² .............................................. A47F 7/04
[52] U.S. Cl. ........................................ 211/20; 211/22
[58] Field of Search ................... 211/17, 18, 24, 19, 211/20, 21, 22, 89, 40, 181, 106

[56] References Cited

U.S. PATENT DOCUMENTS

| 3,455,461 | 7/1969 | Kesling | 211/21 |
| 3,907,114 | 9/1975 | Ewers | 211/24 |

FOREIGN PATENT DOCUMENTS

| 179,205 | 7/1954 | Austria | 211/18 |
| 56,849 | 10/1939 | Denmark | 211/19 |
| 1,315,617 | 2/1962 | France | 211/18 |
| 773,034 | 4/1957 | United Kingdom | 211/20 |
| 867,753 | 5/1961 | United Kingdom | 211/19 |
| 21,832 | 10/1896 | United Kingdom | 211/20 |
| 955,893 | 4/1964 | United Kingdom | 211/19 |

Primary Examiner—Roy D. Frazier
Assistant Examiner—Robert W. Gibson, Jr.
Attorney, Agent, or Firm—Frank H. Marks

[57] ABSTRACT

A bicycle rack comprising one or more standard wheel-retaining modules arranged in multiples of any desired number and configuration on a suitable support, e.g., radial or horizontal, so as to provide maximum bicycle parking facility for a given outdoor or indoor area. The module is of simple, inexpensive mass-produced construction capable of supporting any standard wheel and cooperating with any standard bicycle lock. A preferred form of module comprises a pair of parallel bent rods or the like, vertically disposed.

2 Claims, 21 Drawing Figures

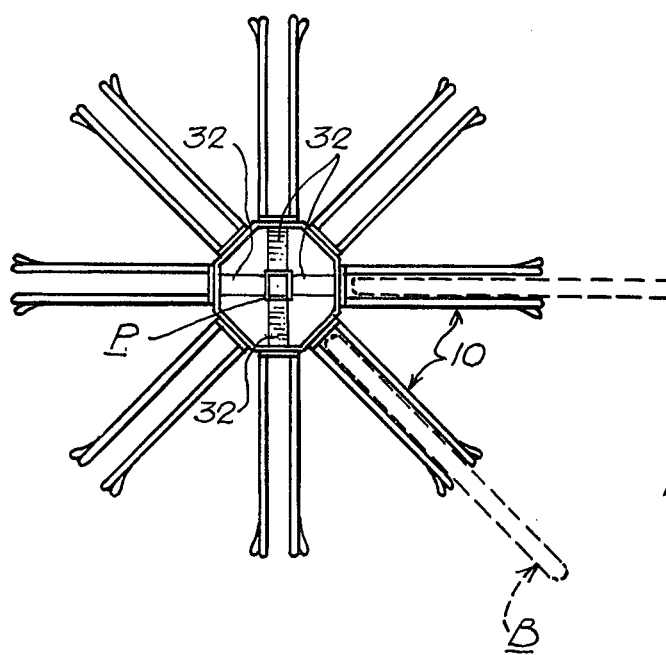
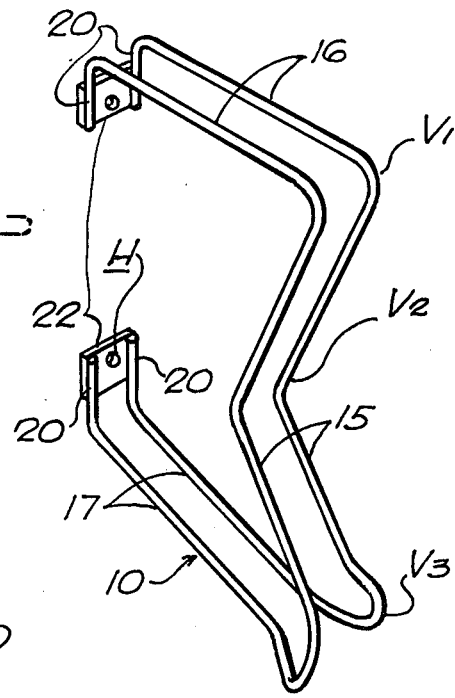
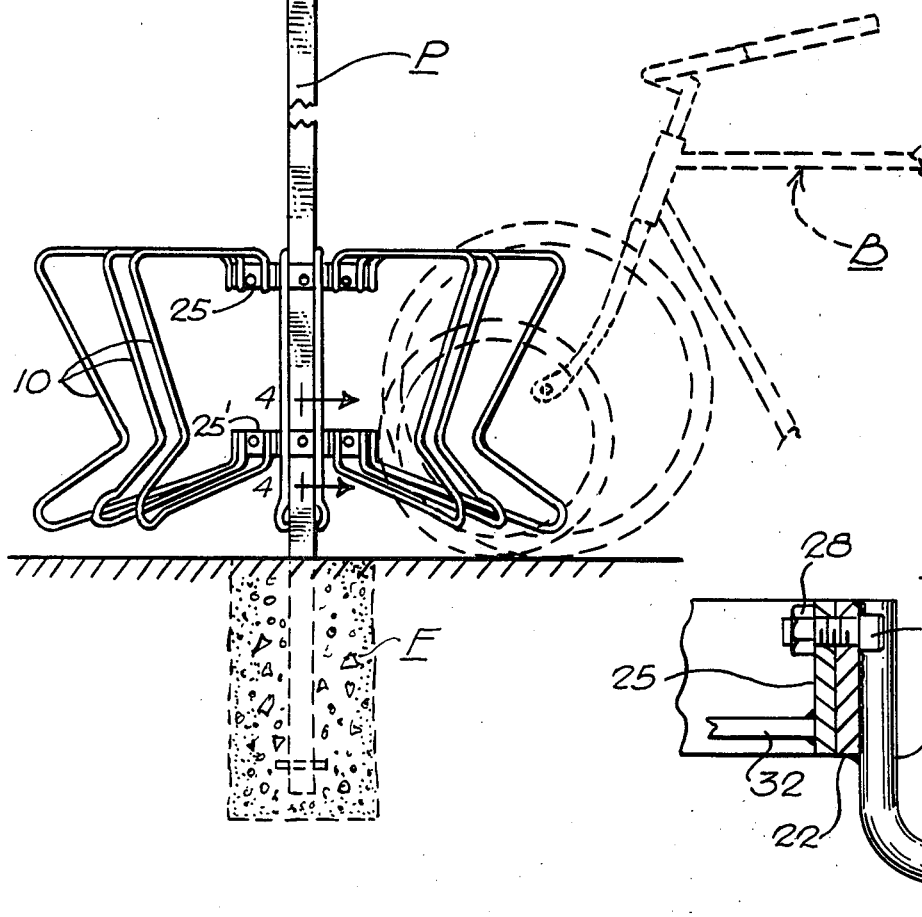
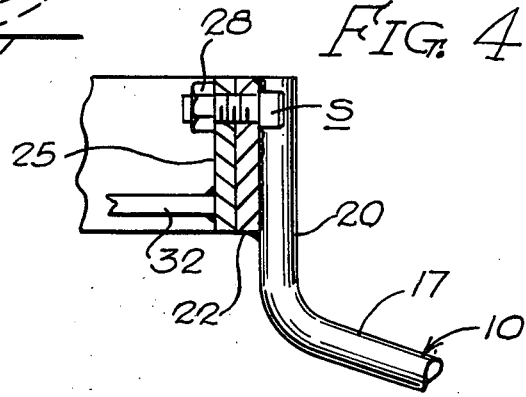

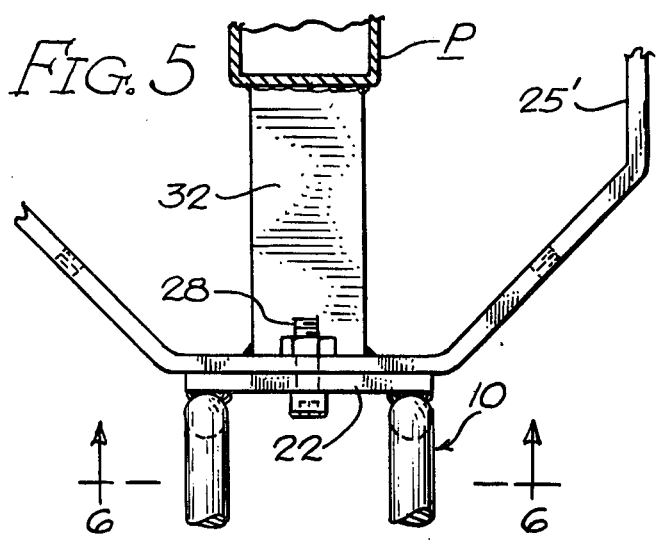
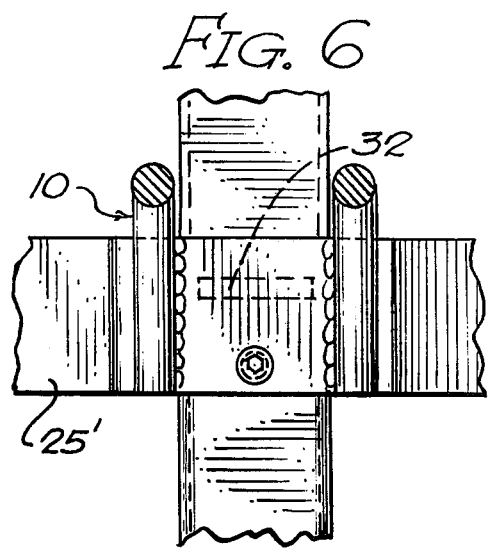
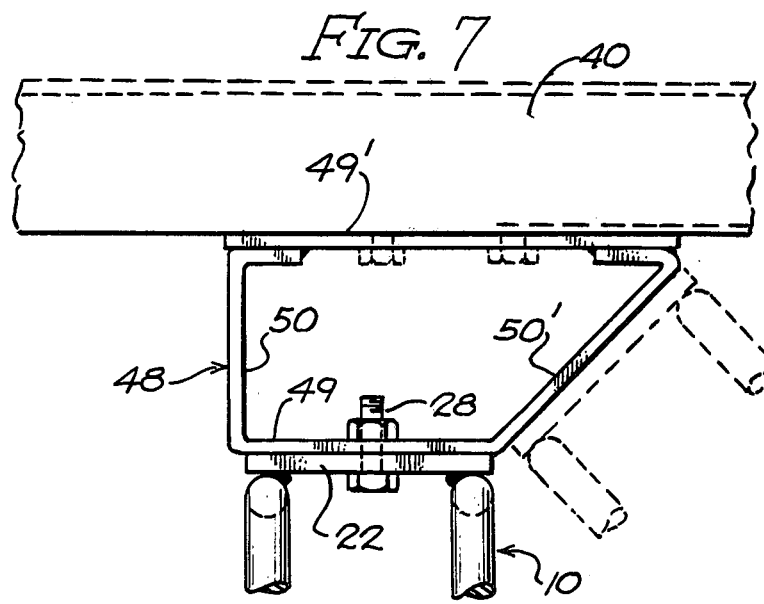
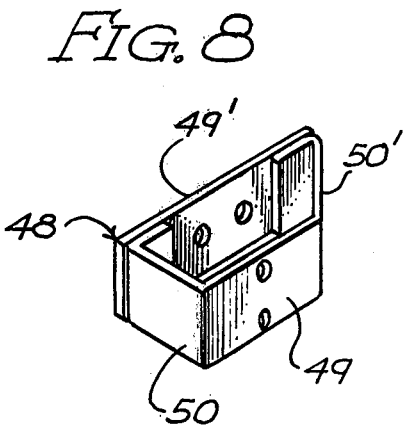
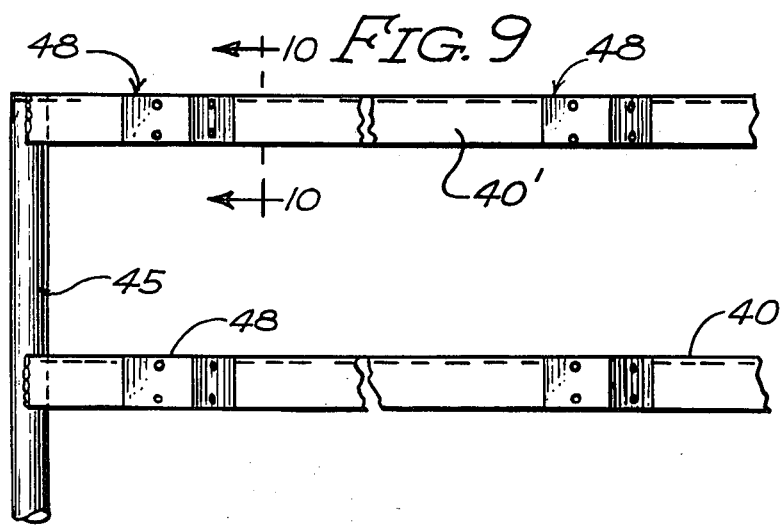
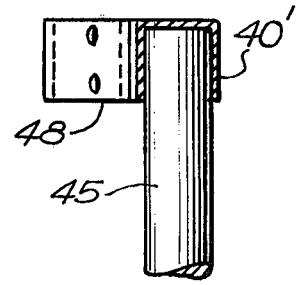

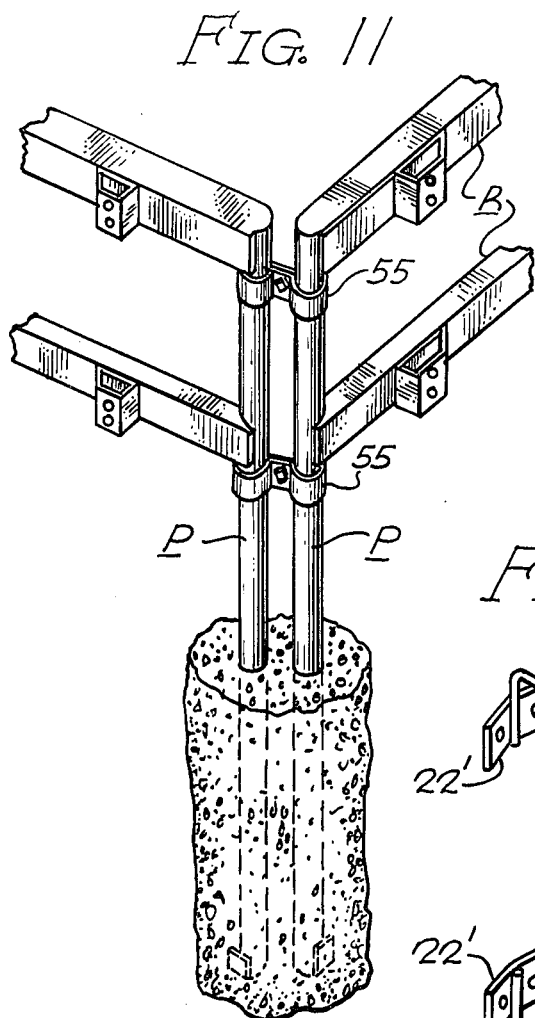
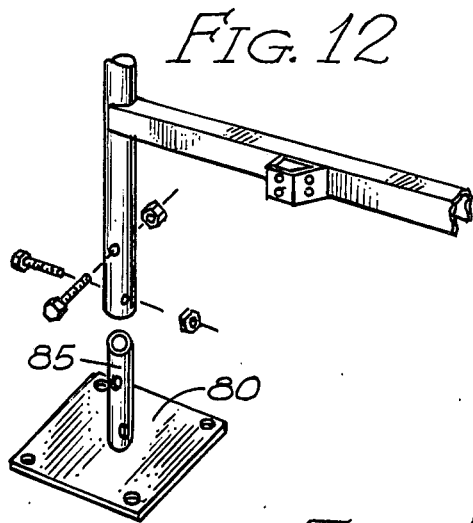
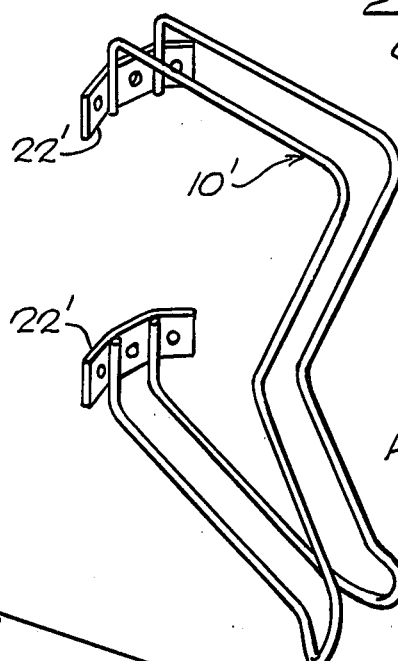
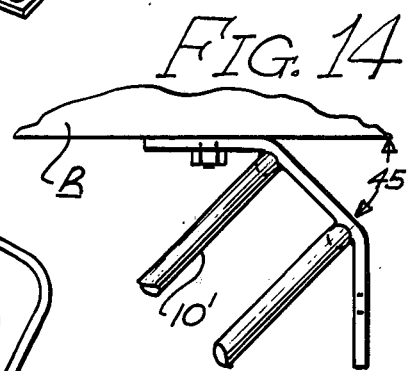
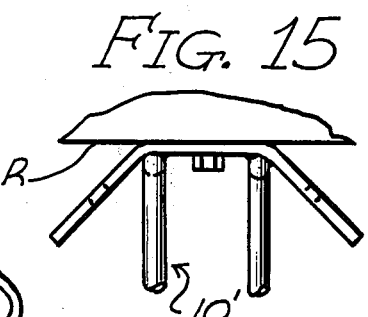
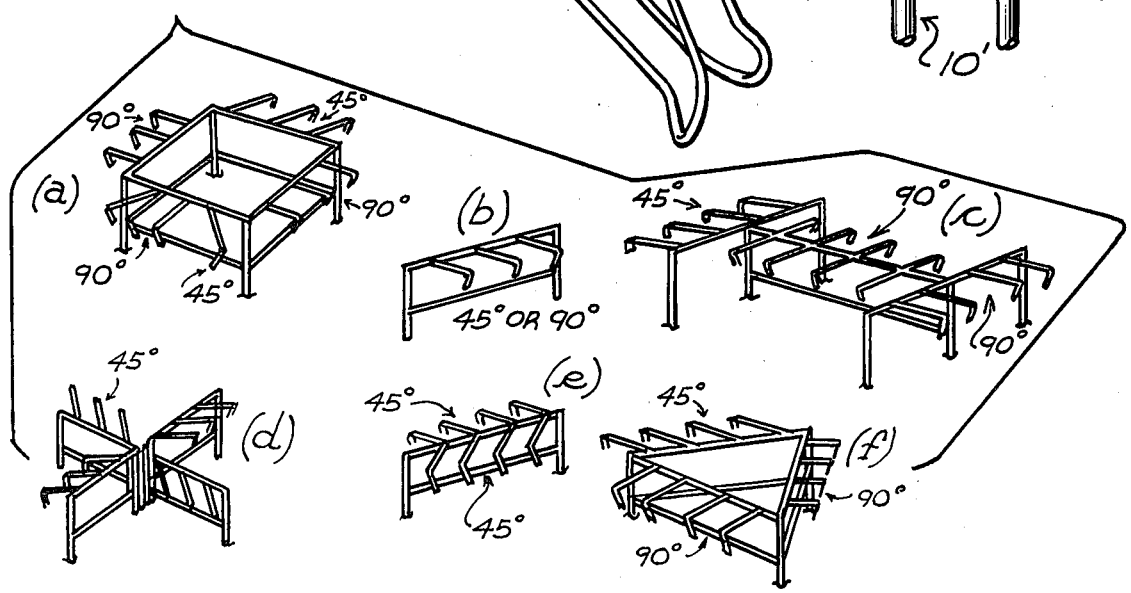

BICYCLE RACK

My invention relates to bicycle racks, and has to do more particularly with new and improved racks designed to be capable of a wide variety of arrangements, to meet different space limitations, by utilization of a standard module in multiples, variously disposed and arranged.

BACKGROUND

Bicycle racks of various forms have long been employed for the parking of bicycles in numbers, to avoid damage to them from contact with other bicycles and to facilitate their convenient identification and removal. Such known racks are usually designed to have a fixed or limited capacity and arrangement and thus lacking the versatility provided by my invention.

BRIEF OUTLINE OF INVENTION

A particular object of my invention is to provide a bicycle rack involving a basic element or module for supporting and retaining a bicycle, which element is mountable in a variety of arrangements, making possible the utilization of minimal space for bicycle parking in various indoor and outdoor environments in or adjacent to public places or dwellings such as apartment houses, and is substantially immune to vandalism.

A further object is to provide a simple, inexpensive wheel-retaining element or module mountable in multiples of any desired number and arrangement to meet bicycle parking needs in any situation.

Still another object is to provide said element or module in tenuous form and of material such as wire or rod stock or the like which will be readily workable as by bending, having resilience and strength.

A further object is to provide a frame-like element or module comprising a pair of spaced parallel bars so formed as to be capable of receiving and seating a bicycle wheel for supporting the bicycle in upright position, said element and multiples thereof being capable of permanent anchoring in a variety of configurations to conform to the available space.

Another object is to provide such an element capable of accommodating any conventional bicycle lock as well as bicycle tires and wheels of all standard sizes.

Various other objects and advantages will suggest themselves to those skilled in the art as the description proceeds.

BRIEF DESCRIPTION OF THE DRAWINGS

Referring now to the drawings forming part of this specification and illustrating preferred embodiments of my invention, FIG. 1 is a perspective view of a wheel supporting element or module embodying my invention;

FIG. 2 is an elevational view of one arrangement for mounting a plurality of elements of FIG. 1;

FIG. 3 is a plan view of the construction of FIG. 2;

FIG. 4 is a fragmentary detailed section-elevation on an enlarged scale taken substantially along line 4—4 of FIG. 2;

FIG. 5 is an enlarged fragmentary plan view of a portion of FIG. 3;

FIG. 6 is a fragmentary detaled elevation-section taken substantially along line 6—6 of FIG. 5;

FIG. 7 is a fragmentary plan view of another arrangement embodying my invention;

FIG. 8 is a perspective view of a bracket seen in FIG. 7, on a reduced scale;

FIG. 9 is a fragmentary elevation on a reduced scale of the arrangement of FIG. 7;

FIG. 10 is an enlarged detailed section taken substantially along line 10—10 of FIG. 9;

FIG. 11 is a perspective view of another arrangement for mounting bicycle supporting units of my invention;

FIG. 12 is a perspective view of an anchor plate for use indoors in supporting devices embodying my invention;

FIG. 13 is a perspective view of my improved support module with a modified attaching plate;

FIG. 14 is an enlarged fragmentary plan view showing the element of FIG. 13 secured to a support;

FIG. 15 is a view similar to FIG. 14 with the module mounted at an angle different to that of FIG. 14, and FIG. 16 ($a$-$f$) is a group of diagrammatic views of additional arrangements which, among others, might be employed for supporting my improved bicycle retaining units, the support modules being fragmentary shown.

DETAILED DESCRIPTION

Referring first to FIG. 1, numeral 10 indicates generally a unit, element or module embodying my invention, designed to seat and retain a bicycle wheel of any standard type and size equipped with any standard tire.

Element 10 is formed preferably of a pair of similar parallel members 15, 15 designed to embrace and support therebetween a bicycle wheel, as seen in FIG. 2. Said members 15 may be formed of suitable rod stock having the desired degree of resilience, workability and strength adequate for the intended function. Iron or steel of suitable gage, say from ¼ to ½ inch, is usually suitable.

Members 15 are bent into a generally sigmoid form having inflection points or vertices $V_1$, $V_2$, $V_3$ with forwardly extending upper and lower legs 16 and 17. Said legs terminate in finger portions 20 bent at about right angles and attached as by welding to mounting plates 22, the latter being tapped as at H to receive mounting screws S (FIG. 4).

Members 15, 15 diverge from each other at one or both vertices $V_1$ and $V_3$ to provide a flared mouth adapted conveniently to receive the leading portion of a wheel to be seated in unit 10, the embodiment of the drawings having such a mouth only at $V_3$. For the remainder of element 10 members 15, 15 may be more or less uniformly spaced apart a somewhat lesser distance than normal average wheel thickness. Thus, said members will resiliently yield or spring about their anchors on plates 22 to grip the wheel seated therebetween and firmly retain it in up-right position.

The arms of element 10 are proportioned to provide optimum support retaining a bicycle wheel in vertical position (FIG. 2). It will be noted that said elements 10 are mounted with their lower extremities above ground level.

Rack Arrangements

FIGS. 2 and 3 show a preferred permanent mounting arrangement for a plurality of wheel supporting elements 10. A post P of any suitable configuration and material, in this case metallic tubing of square section, is anchored in a bed or footing F of concrete. The post may extend upwardly from the ground well beyond the distance required to mount units 10 and may, if desired, carry at or near the top an advertising or other visually attractive device such as a wind-rotatable "weather vane" type of sign.

Secured to post P slightly above ground level (FIG. 2) is a group of bicycle supporting elements 10 in any desired number and arrangement. I show in this case eight units 10 radially disposed in star formation, though the number might be more or less, permitting parking without contact or damage.

To mount units 10 in this case I employ a pair of continuous octagonal upper and lower "rings" 25, 25' formed for example of metal strapping and tapped to accommodate screws 28 for attachment of units 10 (FIG. 4) through their mounting plates 22. Rings 25, 25' are each secured to post P by a spider of radial arms 32, four in this case disposed at 90° angles to each other, formed of metal strapping or the like and welded to members 25, 25' and post P, respectively.

As seen in FIGS. 2 and 3, at least eight bicycles may securely be radially parked in a minimal space by the set-up just described, each side of rings 25, 25' being tapped to accept a mounting plate 22.

FIGS. 7-10, inclusive, show another convenient set-up whereby a plurality of units 10 may be supported along a straight line by fastening them to a horizontal rail of desired length. A pair of vertically spaced members 40, 40' of any suitable material such as a structural shape (eg., a channel, FIG. 10) is supported by a plurality of horizontally spaced posts 45 embedded in the ground. The rails 40, 40' carry a plurality of brackets 48 designed to mount several units 10 on each bracket. As detailed in FIG. 8, bracket 48 is generally rhomboidal with parallel unequal sides 49, 49' connected by sides 50, 50'. Long side 49' has a pair of horizontally spaced apertures for attachment to rail 40 or 40' while sides 49 and 50' are apertured for attachment of a mounting plate 22 of a unit 10 (FIG. 7).

Thus, bracket 48 may be mounted as in FIG. 7 or reversely positioned to accommodate a module 10 at various horizontal angles.

FIG. 11 shows another set-up wherein a pair of posts P embedded in the ground and secured together by post clamps 55 support horizontal rails R extending at any desired angle to each other for mounting units 10. The number of posts and radially extending rails may vary as desired.

FIG. 12 shows, for indoor disposition, a plate 80 for securement to a floor and a post socket 85 attached thereto.

FIG. 13 shows a bicycle support module 10' with a modified mounting plate 22' welded to the ends thereof. Such plate (FIGS. 14 and 15) is likewise versatile, permitting mounting unit 10' at either a 45° angle to rail R (FIG. 14) or normally thereto (FIG. 15).

FIG. 16(a-f) is thought to be self-explanatory, showing diagrammatically a variety of set-ups for bicycle racks whereby my invention may be adapted to a wide variety of topographic or architectural situations, thus further illustrating the wide versatility of my invention.

Conclusion

Various other changes and embodiments coming within the spirit of my invention may suggest themselves to those skilled in the art. Hence, I do not wish to be limited to the specific forms shown or uses mentioned herein, except to the extent indicated in the appended claims.

It will be understood that the term "vertical support" as used in the claims is intended, without limitation, to include a continuous support, such as a post, or a discontinuous support, such as vertically spaced rails or the like.

I claim:

1. A wheel retaining bicycle support, comprising
   a. a pair of similar, resilient wheel-embracing members formed of tenuous material and disposed in vertical, generally parallel planes, said members being spaced apart slightly less than the thickness of wheels to be supported, whereby wheels embraced thereby will be resiliently gripped by said members,
   b. said members having upper and lower extremities and being generally of sigmoid formation in vertical profile, with two vertices projecting forwardly, at least one of said vertices being flared to form a mouth portion to receive a leading portion of a wheel,
   c. said upper and lower extremities having substantially parallel terminal fingers remote from said vertices and bent transversely therefrom in a common vertical plane,
   d. top and bottom mounting members permanently affixed to the respective fingers extending from the upper and lower extremities and deformed to provide means for affixing them to vertically disposed supporting means, said mounting members adapted to be selectively mounted in a plurality of angularly disposed planes relative to the plane of said support means, and
   e. an intermediate connector between each mounting member and vertically disposed supporting means, said connector comprising a planar surface parallel to said supporting means and another surface extending angularly thereto for selective abutment of said mounting member with either of said surfaces to vary the angularity of said bicycle support relative to said supporting means.

2. A combination as in claim 1, wherein said last-mentioned surface extends from said planar surface at an angle of about 135°.

* * * * *